3,243,388
PLASTIC BUILDING MATERIAL
Leo Torsten Ulfstedt, Stockholm, Sweden, assignor to Casius Corporation Limited, Montreal, Quebec, Canada
No Drawing. Filed July 20, 1962, Ser. No. 211,389
Claims priority, application Sweden, July 24, 1961, 7,603/61
3 Claims. (Cl. 260—2.5)

This invention relates to a new material of plastic-bonded concrete with improved properties in relation to similar known materials. The expression "plastic-bonded concrete" in the present specification and claims is intended to comprise a material of concrete type, in which the usual cement, such as Portland cement, has been replaced by a plastic as the binding agent.

Some different types of plastic-bonded concrete materials are previously known. One type of such a material is characterized in that it contains coarse grains of a highly porous mineral material as aggregate, the grains being cemented together by the aid of a plastic. This product may be manufactured in such a manner that the highly porous mineral grains are mixed with a liquid plastic capable of setting, whereupon the mixture so obtained, may be after molding or shaping in other ways, allowed to set and then to harden.

In comparison with previously known similar materials containing other cementing and binding agents, plastic-bonded concrete manufactured as indicated has the special advantages of being more acidproof, less fragile at the edges of shaped bodies and not liable to subsequent shrinking. The disadvantages of the plastic-bonded concrete are especially its limited resistance to fire and its high price, due to the plastic.

The object of the present invention is to provide a plastic-bonded concrete of the above-mentioned type which, in addition to the advantages of the plastic-bonded concretes already known, has improved properties in other respects, especially a better resistance to fire.

According to the invention this result is obtained with a plastic-bonded concrete in which the spaces between the mineral aggregate grains contain expanded plastic, that is, so-called light-weight plastic, having closed pores.

Besides being more fire-proof said plastic-bonded concrete also has a better heat insulating capacity and, in addition thereto, it is gas- and water-proof. In spite of these advantages, the present material can be manufactured with less consumption of plastic.

Preferably the spaces between the highly porous ballast grains in the concrete contain expanded plastic of the same kind as that serving as binding agent between the separate grains. The plastic used for cementing together the coarse ballast grains and for filling up the spaces therebetween may either be the plastic alone as such, or a mixture of the plastic with usual additions, such as plasticizers, fillers and/or pigments, etc.

As aggregate in the plastic-bonded concrete according to the invention may be mentioned grains of dried waste of light-weight concrete, crushed foamed glass, grains of pumice stone, expanded vermiculite, perlite, etc. It may be mentioned, however, that the aggregate grains should not have too coarse and open pore structure, in which case the consumption of plastic would be too large which would mean loss of one of the principal advantages of the invention. Especially good results have been obtained with aggregate material prepared by heating granulated clay, slates, shales, etc., until melting begins, at which stage the mass is blown up and can be discharged from the furnace in the form of highly porous balls with smooth glassy surface. Such products are usually called expanded clay.

The grading of the aggregate is also of importance. In order to keep low the amount of binding agent it would be suitable to use an aggregate material having ideal graduation, that is, such a grading that the bulk density of the material would be maximum. However, if using the aggregate material in such a tight arrangement, it would be very difficult to obtain a complete impregnation of the grains and, moreover, in such a case the volume weight (lbs./cft.) of the plastic would have a tendency to increase in the narrow passage between the grains, whereby the saving in plastic would be only ostensible.

Experiments have shown that the smallest ballast grains should suitably have a size corresponding to a diameter not essentially below 5 millimeters. It is obvious that the grading of the aggregate grains must be so chosen that the free spaces between the grains are considerably larger than the size of the pores of the plastic filling up these intermediate spaces between the grains.

It has been found suitable to treat the mineral grains with a special adhesive in order to improve the adhesion between the foamed plastic and the grains. As an adhesive can be used polyvinyl propionate and polymethylacrylic methylester. The adhesive is preferably applied to the grains in the form of an aqueous dispersion thereof.

The invention also comprises shaped bodies of the plastic-bonded concrete according to the invention. Such shaped bodies may be reinforced, for example with reinforcing rods, in which case the tight cellular or porous structure of the material is advantageous, in so far as it prevents corrosion of the rods. The reinforcement may also be provided in other ways, for example by embedding in the material metal gauze, or nettings of fabric or the like, which may not necessarily be of metal. The said shaped bodies of the plastic-bonded concrete according to the invention may be in the form of slabs, blocks, rods, beams, pipes and rings, for example.

The invention also comprises a process for manufacturing the plastic-bonded concrete. For this purpose, suitably an expandable liquid plastic capable of setting is mixed with coarse grains of highly porous mineral aggregate material, whereupon the mixture so obtained, may be after molding or shaping to the desired form, caused to expand or set.

This may be carried out in different ways. For example, the plastic may be brought together with the aggregate and subjected to a tumbling, whereupon the mixture may be molded and left to expand and set. This method is especially to recommend in cases of manufacturing shaped bodies of large dimensions and in case of using aggregate of comparatively fine grading, and it can be adapted without difficulty as a continual molding process. The mixing apparatus could simply be a common rotating drum.

However, it is also possible to carry out the mixing of the plastic and the aggregate material when the latter is in rest. This may be effected in such a way that a plastic which is in the stage of expansion, is caused to pass from below into a layer of the porous ballast grains where it is allowed to set. When applying this method the layer of grains may be placed on the bottom of a mold or vessel having a not tightly closing cover and provided with an inlet for the plastic at the bottom of the container.

The expandable plastic may either be a thermoplastic, for example polystyrene, polyurethanes, regenerated cellulose, cellulose acetate, polyvinyl chloride and polyvinylacetate, or also a so-called thermosetting plastic, for example phenolic plastics and urea plastics.

The expansion of the plastic or the plastic material may be effected according to the methods commonly used in the manufacture of foamed plastic.

For example, an agent capable of causing expansion of the plastic or the plastic material may be incorporated and evenly distributed therein when the plastic has a doughy consistence, whereupon the expansion is caused to take place before or after the mixing with the grains. In case of thermoplastics, it is suitable to use the plastic in its completely polymerized state and to mix it, in a molten state, with the expansion agent. However, it is also possible to start from the monomer or from a prepolymerizate of the actual plastic. In the latter case, the setting which is necessary for the formation of the porous structure takes place during the polymerization, or the continual polymerization, respectively, of the starting material. In case of using hardenable plastics, on the other hand, it is suitable to use a liquid precondensate of the hardening plastic which is admixed with the blowing or foaming agent and the cross-linking agent and catalysts, so that the plastic can set after the porous structure has been attained by expansion.

However, it is also possible to proceed in such a way that a gas or a low-boiling liquid, which is readily vapourized by heating, is dissolved in a soft plastic or a plastic material, in the former case under pressure. The plastic or plastic material which has been made expandable in this way, is then caused to expand and set in contact with the highly porous mineral ballast grains.

It is also possible, although less advantageous, to produce the plastic-bonded concrete according to the invention in such a way that a low viscous plastic or a low viscous plastic material is foamed by mechanically stirring, whereupon the foam so obtained is brought in contact with the aggregate grains and the plastic is allowed to set or the plastic material to react further with setting and maybe hardening.

It is obvious, that the manner of producing the porous structure of the plastic material filling up the spaces between the highly porous mineral grains is not critical. Applicable for the purpose of the invention is any method by means of which it is possible to impart to a plastic or a plastic material a porous structure and then to stabilize this porous structure by setting of the plastic or plastic material, or by subjecting the starting material to a polymerization, condensation and/or bridge formation with setting. A condition is naturally that the setting takes place only after the plastic has been brought into contact with the ballast material.

The final product obtained according to the invention has many interesting and valuable properties. The volume weight is practically the same as that of the ballast, when measured loosely packed. For example, if using an expanded clay having a volume weight of 350 kg./cm.$^3$ and 30% of which being free interspace between the ballast grains, and if the final volume weight of the foamed plastic is regulated to 25 kg./m.$^3$, a plastic-bonded concrete is obtained having a volume weight of 357.5 kg./m.$^3$ and the consumption of plastic has been only 7.5 kg./m.$^3$.

The strength of the product is naturally to a high degree dependent on the volume weight of the expanded plastic. It may be mentioned that already in the example referred to above when using an expanded plastic of the volume weight 25 kg./m.$^3$, a plastic-bonded concrete is obtained which is suitable for a number of building purposes and having a compression strength of 10 to 20 kp./cm.$^2$ and a toughness and strength at the edges which is not common in connection with such light materials. It may be mentioned that expanded plastic of the above mentioned volume weight has a compression strength of only 1-2 kp./cm.$^2$.

Very valuable properties of the plastic-bonded concrete according to the invention are its impermeability to gases and liquids and its complete waterproofness. On account thereof, it is completely frostproof and free from movements due to moisture. By suitable choice of the ballast material and the plastic it is also possible to obtain a plastic-bonded concrete with satisfactory resistance against acid agencies for example, sulfur compounds often contained in the atmosphere of industrial plants which can be so injurious to the alkali bound common types of concrete and lightweight concrete. Sawn or cut blocks of the plastic concrete according to the invention have surfaces which preferably consist of porous mineral material, the pores in the surface layer of which have been opened by the cut. In view thereof, surface treatment materials, such as plaster or putty, sand spackles and the like, adhere extremely well to said surfaces. Fabricated surface layers or slabs may be applied to the product in connection with the manufacture of the same, in which case the plastic itself serves as an adhering medium.

However, as indicated above, the most surprising property of the plastic-bonded concrete according to the invention is its resistance to fire. In spite of the fact that plastics undergo pyrolysis already at comparatively low temperatures, it has proved that a combination of the expanded plastic with the highly porous mineral grains according to the invention results in a product where the inflammability of the plastic is practically completely removed. The very interesting observation has been made that if the surface of a piece of plastic-bonded concrete according to the invention is exposed to the influence of a flame, the plastic will creep back from the exposed surface and this wandering proceeds until the plastic has disappeared from the surface onto a depth of 10 to 20 mm. The material is now protected by a 10 to 20 mm. layer which merely consists of the highly insulating porous mineral grains. The transfer of heat then proceeds extremely slowly and if the fire does not last for a long time, the product is not injured and can easily be repaired according to any common surface treatment method.

The following examples are given in order to define the invention more precisely but it is to be understood that the examples are not intended as a limitation of the invention in any way.

*Example 1*

In a mixer there was charged 1 m.$^3$ of expanded clay consisting of substantially globular grains having sizes in the range of from 2 to 3, cm., inclusive, and a bulk density of 380 kg./m.$^3$. There were added to the mixture obtained 6 kg. of a polyurethane foam raw material mixture consisting of 100 parts by weight of a mixture of hydroxyl group-containing polyesters, 140 parts by weight of toluylene-diisocyanate, 50 parts by weight of trichloromonofluoro-methane and a minor amount of conventional activators. After a short agitation of the mass, the latter were cast into a mould. Due to the exothermic reaction that takes place, the temperature will rise above the boiling point of the trichloromonofluoromethane (23.8° C.) to cause a foaming of the plastic to take place, so that the spaces between the globular particles are filled up with plastic. After 8 min. the foamed plastic had set completely, whereupon the ready shaped body could be discharged from the mould and, if desired, be sawn into slabs, blocks, etc. The material showed a crushing strength of 13 kg./cm.$^2$ and a volume weight of 386 kg./m.$^3$. Its heat insulating capacity proved to be 0.073 kilogramcalorie/mh.° C.

*Example 2*

A mould provided with means for closing it, the walls of which could endure an inner overpressure amounting to 1.5 kg./cm.$^2$ was charged with expanded clay, the globular particles of which had diameters in the range of from 0.7 to 2.0 cm., inclusive. The bulk density of the clay was 310 kg./m.$^3$, and the mould had a volume of about 0.3 m.$^3$. It could thus take up 93 kg. of expanded clay. The spaces between the clay balls measured about 0.06 m.$^3$. In order to fill up these spaces with foamed plastic having the average volume weight of 30 kg./m.$^3$, there was charged 1.8 kg. of a foamed material starting mixture consisting of 115 parts by weight of a mixture of hydroxyl group-containing polyethers, 145 parts by weight of diphenyl-methane diisocyanate, 55 parts by weight of trichloro-monofluoro methane and a minor amount of conventional activators, which quantity was injected through a little hole in the lower part of the mould. During the expansion of the plastic, the spaces between the clay balls were filled up. After some minutes the mould could be opened and the rigid plastic concrete body be discharged. The process described in this example is very suitable, when the shaped body is not to be divided into smaller bodies, but the mould is in itself so constructed as to give the body the dimension suitable for the use.

*Example 3*

In a perforated wall mould provided with means for closing it, there are charged crushed lightweight concrete having sizes in the range of from 10 to 50 mm., inclusive. From polystyrene in grain form, to which has been added so-called petroleum ether as an expanding agent during the polymerization, there is prepared an intermediate by steam treatment of the expandable polystyrene to cause the grains to blow up into high-porous balls having diameters in the range of from 2 to 7, inclusive, mm. There is charged into the mould such an amount of this pre-expanded polystyrene that the spaces between the lightweight concrete particles are filled up. The mould is then introduced in closed condition into a chamber which is rapidly set under an overpressure of 0.5 atmosphere gauge. Under the influence of this overpressure, the polystyrene balls will expand furthermore and will now fill up the spaces between the lightweight concrete particles completely, while being bound together with each other into a uniform foamed plastic mass. As foamed polystyrene manufactured in this way will only difficultly adhere to the surfaces with which they will get in contact on their final expansion, it is preferable to combine it with aggregates, the surfaces of which have open pores which applies, in this case, with respect to the lightweight concrete particles.

It is to be understood that the invention is not to be limited to the exact details of operation or exact compositions shown and described as obvious modifications and equivalents will be apparent to one skilled in the art, and the invention is therefore to be limited only by the scope of the appended claims.

What I claim is:

1. A building material consisting essentially of expanded clay in grain form as an aggregates and a rigid expanded synthetic resin plastic having closed pores filling up the spaces between said grains and cementing together said grains, wherein the smallest grains have a size corresponding to a diameter not essentially below 5 mm., and the free spaces between the grains are larger than the size of the pores of the plastic filling up these intermediate spaces between the grains.

2. A building material as set forth in claim 1 in which the plastic is polyurethane and the free spaces between the grains are considerably larger than the size of the pores of the plastic filling up these intermediate spaces between the grains.

3. A building material as set forth in claim 2 wherein the plastic covers said grains whereby when the surface of the plastic-bonded building material is subjected to heat the plastic will disappear from the surface.

References Cited by the Examiner

UNITED STATES PATENTS

| | | | |
|---|---|---|---|
| 1,707,395 | 4/1929 | Hayde | 106—288 |
| 2,565,107 | 8/1951 | Watts | 106—122 |
| 2,569,323 | 9/1951 | Maynard | 106—288 |
| 2,824,022 | 2/1958 | Socetti | 106—122 |
| 2,855,021 | 10/1958 | Hoppe. | |
| 2,860,378 | 11/1958 | Urchick. | |

OTHER REFERENCES

Hoppe: "Kunstoffe," vol. 42, No. 12, December 1952, pp. 450–459.

MORRIS LIEBMAN, *Primary Examiner.*

ALLAN LIEBERMAN, *Assistant Examiner.*